May 19, 1953 — C. J. BOCK — 2,639,195

BRAKE DRUM VIBRATION DAMPER

Filed March 18, 1949

Inventor
Carl J. Bock
By Spencer, Willits, Helmig & Baillio
Attorneys

Patented May 19, 1953

2,639,195

UNITED STATES PATENT OFFICE 2,639,195

BRAKE DRUM VIBRATION DAMPER

Carl J. Bock, Birmingham, Mich., assignor to General Motors Corporation, Detroit, Mich., a corporation of Delaware Application March 18, 1949, Serial No. 82,247

9 Claims. (Cl. 301—6)

This invention relates to brake drum vibration dampers.

The brake drum vibration damper has a bracket secured to the drum and holds a friction material plug in contact with the wheel rim. The contact pressure between the friction material and rim may be varied by the use of shims or other adjusting means. The bracket may also support balance weights.

The object of this invention is to provide an improved and simplified brake drum vibration damper cooperating between the brake drum element and another element of the wheel and having a portion attached to one of said elements and an adjustable friction material portion adjustably bearing against the other of said elements to damp any vibrations in said drum to the proper degree.

Another object of this invention is to provide a simplified brake drum damper block which may be attached to the brake drum and has friction material plugs bearing firmly against the wheel rim.

Other objects and advantages will be apparent from the complete description of the invention in the drawing and specification.

Figure 1:
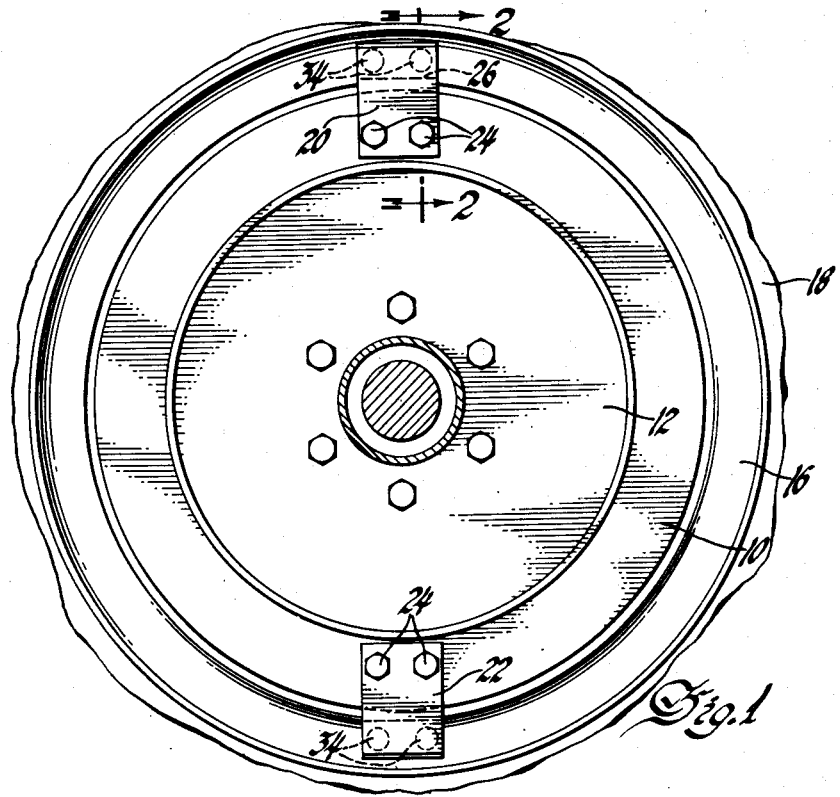
Figure 1 is an elevation, partially in section, of a brake drum and wheel with vibration damper.
Figure 2:
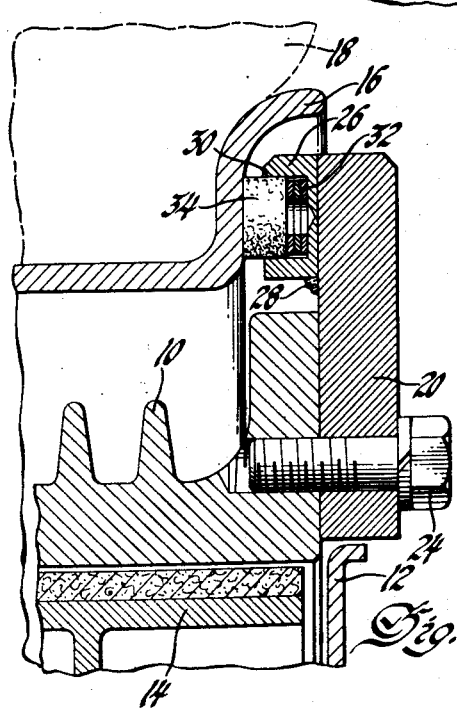
Figure 2 is an enlarged, partial section on the line 2—2 of Figure 1 showing a damper.

Many brake drums vibrate during brake application and produce a squeal. These high-pitch vibrations not only produce objectionable noise, but reduce the efficacy and life of the brake lining. This vibration damper may be mounted on any conventional vehicle and brake drum. Figure 1 shows a brake drum 10 with a backing plate 12 enclosing the brake shoes 14, and a rim 16 for the usual tire 18, a portion of which is shown in dot-and-dash lines. The brake drum vibration dampers 20 and 22 are used in pairs placed in diametrically opposed positions on the wheel to maintain the balance. Though two dampers have been found sufficient to damp the vibration and to maintain the wheel in proper balance, it will be appreciated that the damping effect would be increased by employing more dampers positioned on the wheel to maintain the balance.

Each of the dampers 20 and 22 is attached to the flange of brake drum 10 by suitable securing means, such as a pair of bolts 24. The damper extends outwardly from the drum to a position adjacent the rim 16. In general, a damper block 20 having rectangular shape with an offset portion 26 attached to the block by suitable means, such as welding 28, will suitably support friction material for contact with the rim. However, it will be understood that variations in the shape of this rigid structure may be necessary with different wheel designs, to provide a support for the friction material adjacent the rim. Each block has a bore 30 opening adjacent to and facing the wheel rim. A series of shims or washers 32 are positioned in the base of each bore to position a friction material plug or stud 34 that fits snugly into the bore and bears against the wheel rim with sufficient pressure to damp the vibrations of the drum.

The vibration dampers 20 and 22 are installed at diametrically opposite points on the flange of the brake drum 10. Holes are drilled and tapped in the flange for the bolts 24 which hold the block 20 on the flange. The friction material plug 34 should engage the rim 16 during the last few turns of the bolts 24 so that these plugs are under pressure in their engagement with the rim. The pressure on plugs 34 may be increased or reduced by the insertion or removal of shims 32. Thus the pressure may be varied to provide a more advantageous damping action for any particular brake drum.

Figure 3:
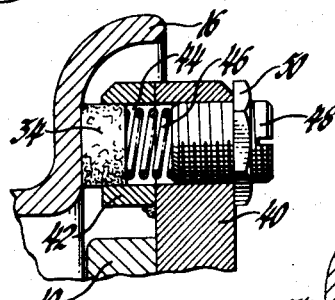
Figure 3 is a partial cross-section showing a modification.

In the modification illustrated in Figure 3 a similar block 40 is secured to the brake drum flange. The block 40 has an offset portion 42 attached thereto with a bore 44 extending through both the offset portion and the block. A friction material plug 34 is positioned within the bore 44 and held in contact with the wheel rim 16 preferably by the stiff spring 46 and the adjustable screw 48 and the lock nut 50. The adjustable screw 48 is preferably used to adjust the pressure exerted by the spring 46, but it may be used without a spring to engage the friction material plug directly. Thus the pressure of the friction material plug on the wheel rim may be varied to best damp the vibrations.

Figure 4:
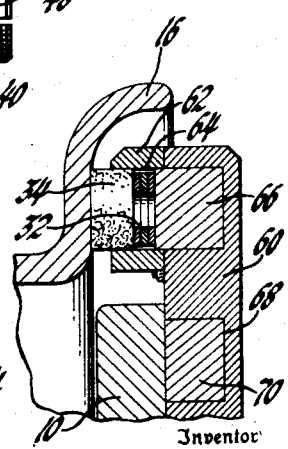
Figure 4 is a partial cross-section showing another modification.

The damper blocks may be made in various standard weights with insertable or removable portions for variations between standard sizes, and thus serve the dual function of acting as damper blocks and wheel balancing weights. In the modification shown in Figure 4 the block 60 has an offset portion 62 with a bore 64 extending through the offset portion and partially through the block. A friction material plug 34 is positioned within the bore and rests on shims 32. The shims bear on a lead weight 66 positioned within the bore 64. The weight of the assembly may be changed by substituting a friction material plug for the weight. Another cavity 68 may be provided in the block 60 to receive another weight 70. The combined balancing and damper blocks would be attached to the brake drum at the proper circumferential position to balance the unbalanced weight of the wheel.

The above specific embodiments of the invention will suggest other modifications within the scope of the claims.

I claim:

1. A vibration damper for a brake drum, said damper having means to secure it to said brake drum, a bore in said damper, friction means in said bore for engagement with another portion of the wheel, and means longitudinally adjustable in said bore to vary the pressure on said friction means.

2. In a wheel having a drum member and a rim member, a vibration damper attached to a point on the circumference of one of said members, said damper having friction means engaging a point on the circumference of the other member under pressure to damp the vibrations of said members and having variable balancing weights for balancing said wheel.

3. In a wheel having a brake drum and a rim, a vibration damper consisting of a block firmly secured to said drum at a point adjacent the perimeter of said drum, said block extending radially to a point adjacent said rim, the width of said block extending over a very minor portion of the perimeter of said drum, the major portion of the perimeter of said drum being free, a friction material stud positioned on said block adjacent said rim and resiliently pressing against said rim to damp the vibrations of said drum.

4. In a wheel having a brake drum and a rim, a vibration damper consisting of means firmly secured to said drum at a point adjacent the perimeter of said drum, said means extending radially to a point adjacent said rim, the width of said means extending over a very minor portion of the perimeter of said drum, the major portion of the perimeter of said drum being free, a friction material stud positioned on said means adjacent said rim and resiliently pressing against said rim to damp the vibrations of said drum.

5. In a wheel having a brake drum and a rim, a vibration damper consisting of a support firmly secured to one of said members at a point adjacent the perimeter of said drum, said support extending radially to a point adjacent said rim, the width of said support extending over a very minor portion of the perimeter of said drum, the major portion of said one of said members being free, a friction material stud positioned on said support adjacent said rim and resiliently pressing against said rim to damp the vibrations of said members.

6. In a wheel having a brake drum and a rim, a vibration damper consisting of a block firmly secured to said drum at a point adjacent the perimeter of said drum, said block extending radially to a point adjacent said rim, the width of said block extending over a very minor portion of the perimeter of said drum, the major portion of the perimeter of said drum being free, a friction material stud positioned on said block adjacent said rim and resiliently pressing against said rim to damp the vibrations of said drum, a cavity in said block opening toward said drum and a balancing weight in said cavity.

7. A vibration damper for a brake drum as defined in claim 1, and resilient means between said friction means and said means longitudinally adjustable in said bore.

8. In a wheel having a brake drum and a rim as defined in claim 4 and resilient means mounted on said means firmly secured to said drum and resiliently urging said friction material stud against said rim.

9. In a wheel having a brake drum and a rim as defined in claim 5 and resilient means mounted on said means firmly secured to said drum and resiliently urging said friction material stud against said rim.

CARL J. BOCK.

References Cited in the file of this patent

UNITED STATES PATENTS

| Number | Name | Date |
| --- | --- | --- |
| 1,589,449 | Williams | June 22, 1926 |
| 1,777,223 | Pugh | Sept. 30, 1930 |
| 1,833,413 | Chase | Nov. 24, 1931 |
| 1,859,280 | Corbin | May 24, 1932 |
| 1,914,490 | Dodge | June 20, 1933 |
| 2,197,583 | Koeppen | Apr. 16, 1940 |
| 2,532,086 | Chapman | Nov. 28, 1950 |